United States Patent
Chen et al.

(10) Patent No.: US 9,787,966 B2
(45) Date of Patent: Oct. 10, 2017

(54) METHODS AND DEVICES FOR CODING INTERLACED DEPTH DATA FOR THREE-DIMENSIONAL VIDEO CONTENT

(71) Applicant: Industrial Technology Research Institute, Hsinchu (TW)

(72) Inventors: Fang-Chu Chen, Taiwan (TW); Ching-Chieh Lin, Taipei (TW); Wen-Hao Chung, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1142 days.

(21) Appl. No.: 13/725,198

(22) Filed: Dec. 21, 2012

(65) Prior Publication Data

US 2014/0063185 A1     Mar. 6, 2014

Related U.S. Application Data

(60) Provisional application No. 61/696,658, filed on Sep. 4, 2012.

(51) Int. Cl.
*H04N 1/00* (2006.01)
*H04N 13/00* (2006.01)
*H04N 19/597* (2014.01)

(52) U.S. Cl.
CPC ..... *H04N 13/0048* (2013.01); *H04N 13/0011* (2013.01); *H04N 19/597* (2014.11)

(58) Field of Classification Search
CPC ........... H04N 13/0055; H04N 13/0048; H04N 19/597; H04N 13/0011

USPC ......................................................... 348/43
See application file for complete search history.

(56) References Cited

U.S. PATENT DOCUMENTS

| | | | |
|---|---|---|---|
| 6,259,732 B1 * | 7/2001 | Lee | H04N 19/563 375/240 |
| 7,650,036 B2 | 1/2010 | Lei et al. | |
| 2005/0084006 A1 | 4/2005 | Lei et al. | |
| 2009/0003447 A1 * | 1/2009 | Christoffersen | H04N 19/61 375/240.16 |
| 2012/0140819 A1 | 6/2012 | Kim et al. | |
| 2013/0127823 A1 * | 5/2013 | Diverdi | G06T 17/10 345/419 |
| 2015/0195549 A1 * | 7/2015 | Wang | H04N 19/70 375/240.12 |

OTHER PUBLICATIONS

Raúl Mohedano, et al., "Analysis of the Alternatives for Stereo Multiplex in 3DTV Broadcast Delivery," 2011 IEEE (4 pgs.).
Jun Zhang, et al., "Joint Multiview Video Plus Depth Coding," IEEE International Conference on Image Processing 2010 (pp. 2665-2868).

(Continued)

*Primary Examiner* — Mishawn Hunter
(74) *Attorney, Agent, or Firm* — Finnegan, Henderson, Farabow, Garrett & Dunner LLP

(57) ABSTRACT

A method and device for coding interlaced video data. The method includes coding interlaced video data captured from a plurality of different positions, the interlaced video data including data for a top field and a bottom field for at least one interlaced video scan, the top field including every other line starting with a top line of a frame and the bottom field including interposed lines in the frame.

18 Claims, 8 Drawing Sheets

(56) References Cited

OTHER PUBLICATIONS

Qiong Liu, et al., "Cross-View Down/Up-Sampling Method for Multiview Depth Video Coding," IEEE Signal Processing Letters, vol. 19, No. 5, May 2012 (pp. 295-298).

Hsien-Huang Wu, et al., "Directional Interpolation for Field-Sequential Stereoscopic Video," IEEE International Symposium on Circuits and Systems 2005, (pp. 2879-2882).

P. Merkle, et al., "Video Plus Depth Compression for Mobile 3D Services," 3DTV-Conference 2009,4 pgs.

Lee, et al., "On the Efficient Algorithm/Architecture Co-Exploration for Complex Video Processing," IEEE International Conference on Multimedia and Expo 2008, (pp. 1057-1060).

Maiti, et al., "Multiview Video and Depth Coding," 2012 Picture Coding Symposium, May 7-9, 2012, Kraków, Poland (pp. 125-128).

Fang-Chu, et al., 3DV AVC Based Inferface Multiview Plus Depth Coding (revised version 2), International Organization For Standardization Organization Internationale De Normalization ISO/IEC JTC1/SC29/WG11 Coding of Moving Pictures and Audio, ISO/IEC JTC1/SC29/WG11, MPEG/M25069, Apr. 2012, Geneva, Switzerland.

Sally Hattori, et al., "3DV Technical Input: JMVC Software Integration of Coding Interface Texture With Progressive Depth Based on WD on MVC Extensions For Including of Depth Maps," International Organization For Standardization Organization Internationale De Normalization ISO/IEC JTC1/SC29/WG11 Coding of Moving Pictures and Audio, ISO/IEC JTC1/SC29/WG11, MPEG2011/M224731, May 2012, Geneva, CH.

Ching-Chieh Lin, et al., "3DV Technical Input: JMVC Software of Coding Interlace Texture with Interlace Depth," International Organization For Standardization Organization Internationale De Normalization ISO/IEC JTC1/SC29/WG11 Coding of Moving Pictures and Audio, ISO/IEC JTC1/SC29/WG11, MPEG2012/M26157, Jul. 2012, Stockholm, Sweden.

\* cited by examiner

METHODS AND DEVICES FOR CODING INTERLACED DEPTH DATA FOR THREE-DIMENSIONAL VIDEO CONTENT

RELATED APPLICATIONS

This application is based upon and claims the benefit of priority from U.S. Provisional Patent Application No. 61/696,658, filed Sep. 4, 2012 the entire contents of which are incorporated herein by reference.

FIELD OF THE DISCLOSURE

This disclosure relates to systems and methods for coding interlaced depth data for three-dimensional video content.

BACKGROUND

Three-Dimensional (3D) video content utilizes a large amount of data depending on the number of views being provided. Depth information and synthesis tools may be utilized to generate multi-view videos with the use of data from just a few captured views. The generated multi-view 3D video content is utilized in movies, displays, and camcorders. Conventionally, 3D video coding standards and devices utilize interlaced coding for texture data but utilize progressive depth coding. This leads to inefficiencies when synthesized views are generated because some of the texture views and depth views are captured at different times due to the use of interlaced texture coding and progressive depth coding. For example, texture data is captured at every $1/60^{th}$ of a second while depth data is captured only every $1/30^{th}$ of a second. Therefore, no corresponding depth data is captured every other time that texture data is captured, leading to inefficient rendering of frames.

SUMMARY

According to one of the embodiments of the present disclosure, there is provided a method for coding interlaced video data captured from a plurality of different positions, the interlaced video data including data for a top field and a bottom field for at least one interlaced video scan, the top field including every other line starting with a top line of a frame and the bottom field including interposed lines in the frame, the method comprising: capturing texture data and corresponding depth data for each respective position for both the top field and the bottom field of the at least one interlaced video scan; encoding the captured texture data and the corresponding captured depth data; and assembling the encoded texture data and the corresponding encoded depth data for a captured moment in an access unit.

According to another one of the embodiments of the present disclosure, there is provided a method for decoding interlaced video data, comprising: receiving at least two access units, a first access unit including encoded texture data and corresponding encoded depth data for at least one capturing position for a top field of at least one interlaced video scan and a second access unit including encoded texture data and corresponding encoded depth data for the at least one capturing position for a bottom field of the at least one interlaced video scan; and decoding the first and second access units to generate field pictures, wherein for each of the at least one capturing position, respective depth field pictures and respective texture field pictures are generated for both the top field and the bottom field.

According to another one of the embodiments of the present disclosure, there is provided a device for coding interlaced video data captured from a plurality of different positions, the interlaced video data including data for a top field and a bottom field for at least one interlaced video scan, the top field including every other line starting with a top line of a frame and the bottom field including interposed lines in the frame, comprising one or more processors, the one or more processors being configured to: capture texture data and corresponding depth data for each respective position for both the top field and the bottom field of the at least one interlaced video scan; encode the captured texture data and the corresponding captured depth data; and assemble the encoded texture data and the corresponding encoded depth data for a captured moment in an access unit.

According to another one of the embodiments of the present disclosure, there is provided a device for decoding interlaced video data, comprising one or more processors, the one or more processors being configured to: receive at least two access units, a first access unit including encoded texture data and corresponding encoded depth data for at least one capturing position for a top field of at least one interlaced video scan and a second access unit including encoded texture data and corresponding encoded depth data for the at least one capturing position for a bottom field of the at least one interlaced video scan; and decode the first and second access units to generate field pictures, wherein for each of the at least one capturing position, respective depth field pictures and respective texture field pictures are generated for both the top field and the bottom field.

According to another one of the embodiments of the present disclosure, there is provided a non-transitory computer readable recording medium for storing one or more programs, the one or more programs causing a processor to perform the methods described herein.

According to another one of the embodiments of the present disclosure, there is provided a chip for coding interlaced video data captured from a plurality of different positions, the interlaced video data including data for a top field and a bottom field for at least one interlaced video scan, the top field including every other line starting with a top line of a frame and the bottom field including interposed lines in the frame, comprising one or more integrated circuits, the one or more integrated circuits being configured to capture texture data and corresponding depth data for each respective position for both the top field and the bottom field of the at least one interlaced video scan; encode the captured texture data and the corresponding captured depth data; and assemble the encoded texture data and the corresponding encoded depth data for a captured moment in an access unit.

According to another one of the embodiments of the present disclosure, there is provided a chip for decoding interlaced video data, comprising one or more integrated circuits, the one or more integrated circuits being configured to receive at least two access units, a first access unit including encoded texture data and corresponding encoded depth data for at least one capturing position for a top field of at least one interlaced video scan and a second access unit including encoded texture data and corresponding encoded depth data for the at least one capturing position for a bottom field of the at least one interlaced video scan; and decode the first and second access units to generate field pictures, wherein for each of the at least one capturing position, respective depth field pictures and respective texture field pictures are generated for both the top field and the bottom field.

It is to be understood that both the foregoing general description and the following detailed description are exemplary and explanatory only, and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Figure 1:
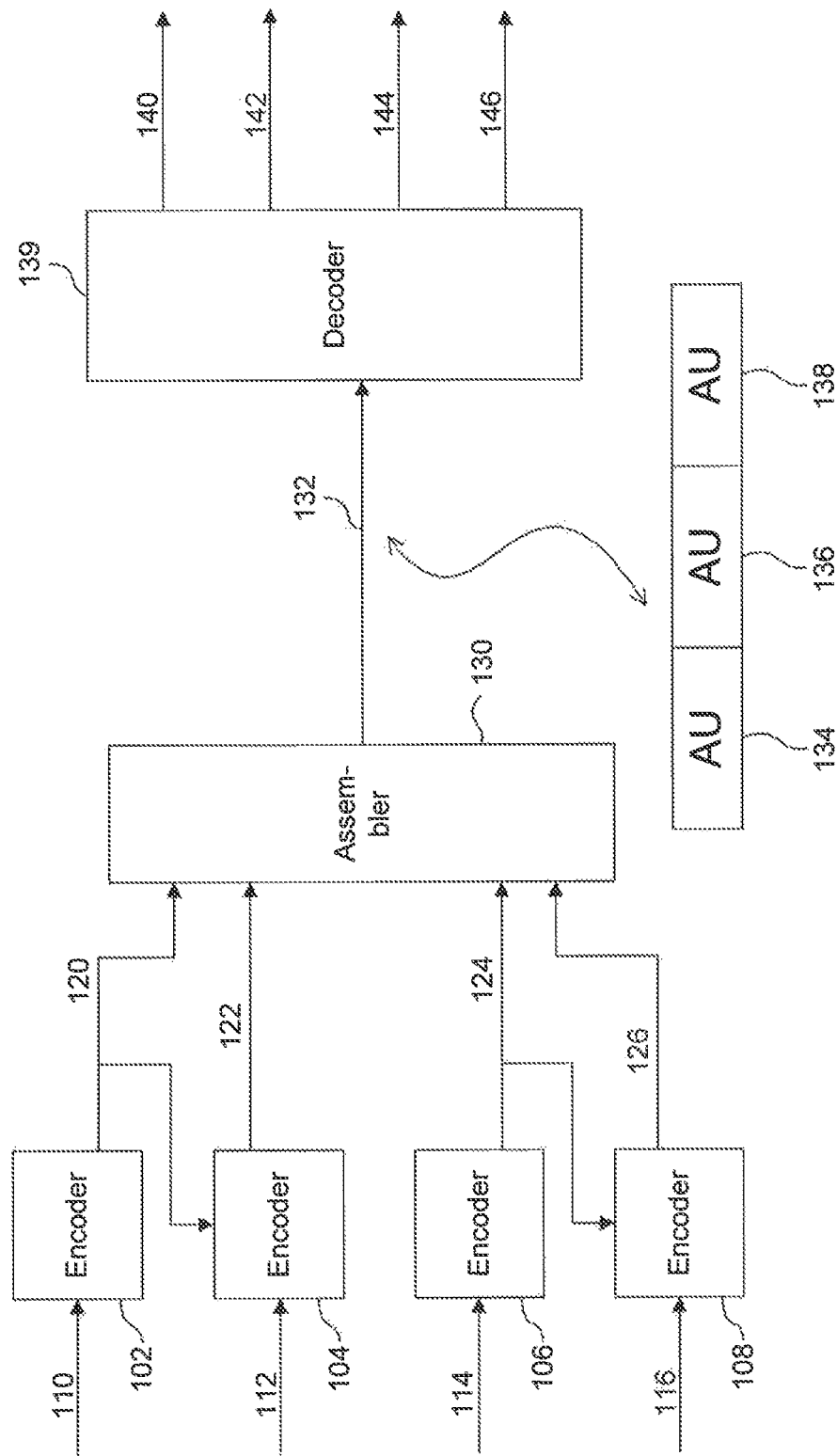
FIG. 1 illustrates a block diagram of a system for coding interlaced depth data, according to an exemplary embodiment.

Reference will now be made in detail to exemplary embodiments, examples of which are illustrated in the accompanying drawings. The following description refers to the accompanying drawings in which the same numbers in different drawings represent the same or similar elements, unless otherwise represented. The implementations set forth in the following description of exemplary embodiments do not represent all implementations consistent with the invention. Instead, they are merely examples of systems and methods consistent with aspects related to the invention, as recited in the appended claims.

In exemplary embodiments, there are provided systems and methods for coding interlaced depth data for three-dimensional video content. Texture data or depth data, in the form of views or images, may be captured from particular camera capturing positions. Texture data refers to luma and chroma information for each pixel captured from a capturing position, while depth data refers to luma information captured from a capturing position. In disclosed embodiments, the luma information is a gray level image containing information regarding objects in a captured view. Accordingly in a gray level image, lighter shaded objects are closer to a capturing position and darker objects are further away from the capturing position. A set of captured views containing texture and depth views may be utilized to synthesize 3D video content.

An interlaced frame based video consists of two distinct fields: a top field that includes every other, e.g., odd numbered, line starting with the top line of the frame, and a bottom field that contains the interposed, e.g., even numbered, lines. Either the top or bottom field may be from an earlier moment in time than the other field, making it the dominant field. Field dominance must be consistent throughout a video stream. For example, for an interlaced video with a frame rate at 30 frames per second, data is captured every $\frac{1}{60}^{th}$ of a second and alternates between first capturing data related to a top field and then the bottom field.

All of the depth data and texture data (depth views and texture views) from different positions captured at a particular time may then be encoded by encoders. The encoded data may then be included in one access unit by an assembler. The access unit may be a part of a bitstream that is transmitted to decoders. The decoders may then decode the data encoded in the access unit and render views/pictures based on depth data and corresponding texture data at each moment that data is captured. A first access unit may include data to render the top field, that is, the top most line and every other line thereafter of a frame and a second access unit may include data to render bottom field, that is the lines of the frame interposed between the top field lines.

Capturing corresponding interlaced depth data along with the texture data at each moment that data is captured allows for efficiency in reconstructing frames at a certain position. This efficiency allows for a more efficient synthesis of a 3D video content.

FIG. 1 illustrates a block diagram of a system 100 for coding interlaced depth data, according to an exemplary embodiment. System 100 includes encoders 102, 104, 106, and 108. Encoders 102 and 104 receive captured texture views 110 and 112. Encoders 106 and 108 receive captured depth views 114 and 116. Encoders 102, 104, 106 and 108 output encoded texture data units 120, 122, 124, and 126, respectively, based on the received views 110, 112, 114 and 116. An assembler 130 receives encoded texture data units 120, 122, 124 and 126 and assembles access units (AUs) which are outputted as a bitstream 132. In this exemplary embodiment, bitstream 132 includes AUs 134, 136, and 138. Bitstream 132 is transmitted to decoder 139 which decodes bitstream 132 to provide texture views 140 and 142 and depth views 144 and 146, for each respective AU that is transmitted. Texture view 140 corresponds to depth view 144 while texture view 142 corresponds to depth view 146. As explained in further detail below, the correspondence between respective texture views and depth views is based on them sharing a capturing position. In a perfect transmission and encoding environment, texture views 140 and 142 are identical to captured texture views 110 and 112 while depth view 144 and 146 are identical to captured depth views 114 and 116. Views 140, 142, 144, and 146 may be utilized in the process for synthesizing a 3D view. In some embodiments, encoded texture data units 120 and 124 are provided to respective encoders 104 and 108. Accordingly, encoder 104 may encode only the difference between the received captured view 112 and encoded texture data unit 120 to produce encoded texture data unit 122. Similarly, encoder 108 may encode only the difference between the received captured view 116 and encoded texture data unit 124 to produce encoded texture data unit 126. This allows for the use of a lesser amount of data in an access unit to provide information regarding multiple related views.

Figure 2:
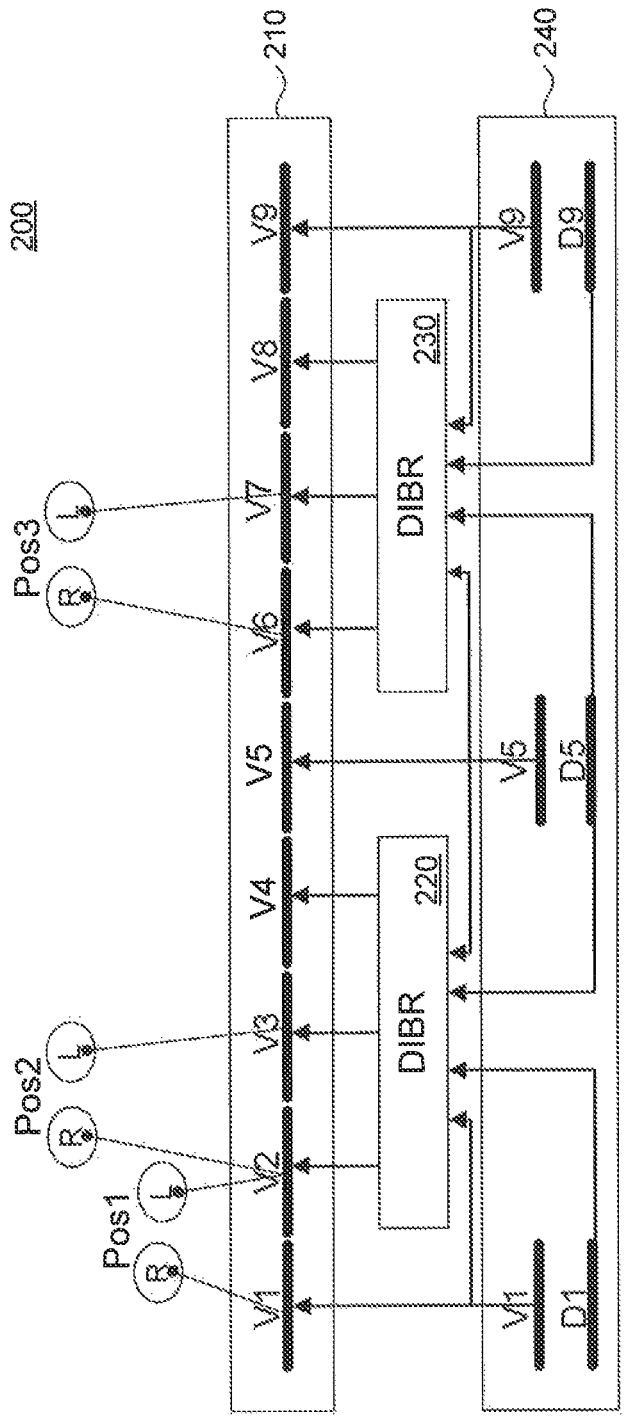
FIG. 2 shows an exemplary system or synthesizing a video frame based on data related to several views.

FIG. 2 shows an exemplary system 200 for synthesizing a video frame based on data related to several views. Specifically, exemplary system 200 generates nine output texture views (N=9) using 3 captured input texture views with corresponding depth views (K=3), in accordance with an embodiment. The framework 200 involves an autostereoscopic 3D display 210, which supports output of multiple views, a first depth image-based renderer 220, a second depth image-based renderer 230, and a buffer 240 for decoded data. The decoded data is a representation known as Multiple View plus Depth (MVD) data which may be provided by a decoder, for example, when decoder 139 decodes an access unit with three texture views and three corresponding depth views. The nine output views based on texture are denoted by V1 through V9. Corresponding depth views for the three captured input texture views (V1, V5, and V9) are denoted by D1, D5, and D9. Any views for virtual camera positions between the actual capturing camera positions (for example, Pos 1, Pos 2, Pos 3 for capturing V1, V5 and V9) may then be generated using the available depth maps (D1, D5, D9), as shown in FIG. 2.

Figure 3:
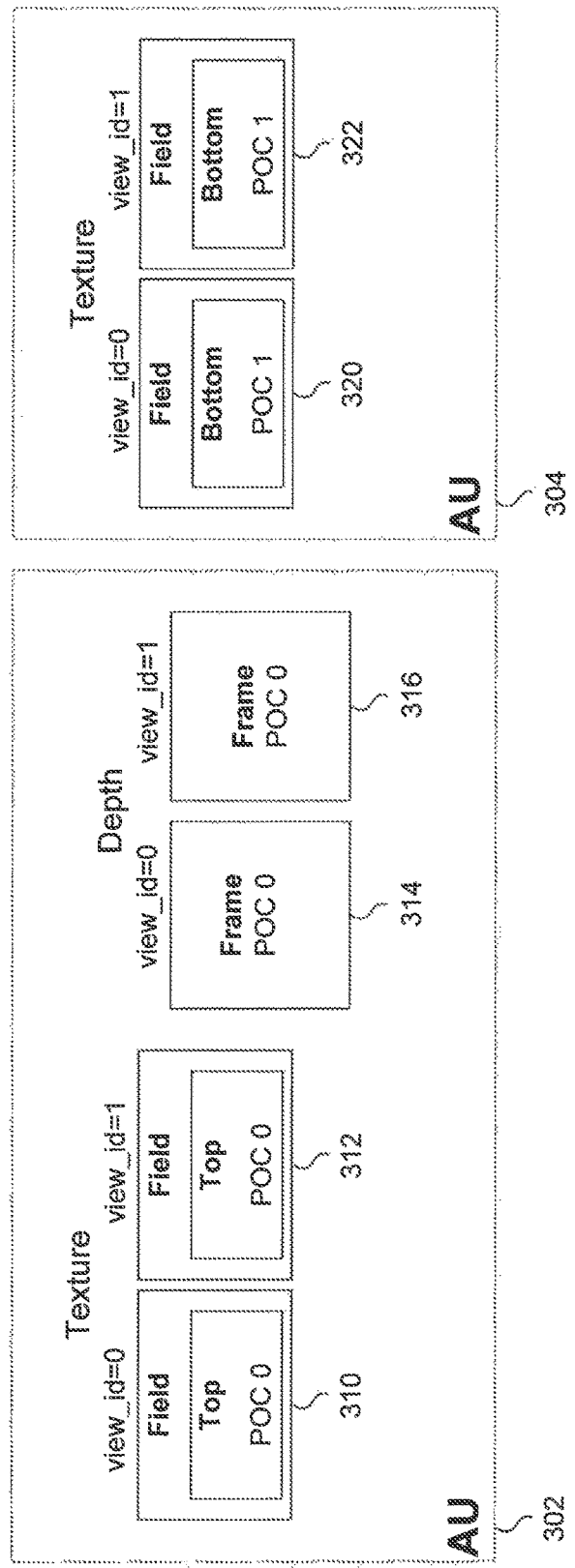
FIG. 3 illustrates exemplary access units generated when interlaced texture data is captured and progressive depth data is captured.

FIG. 3 illustrates exemplary access units 302 and 304 generated when interlaced texture data is captured and progressive depth data is captured. Here, AU 302 and AU 304 respectively contain data based on data that is captured at a first picture order count (POC) 0, that is, the time or moment at which image data is captured, and at a second POC 1. For any subsequent AUs, the POC would keep incrementing by one. As known in the art, POC refers to a feature that keeps the order of images based on timing information. Accordingly, a first image or set of images for a video is captured at POC 0, subsequently incrementing by one at every additional capturing moment, i.e., POC 1, POC 2, etc.

The data included in AU 302 is encoded data based on the first data that is captured at POC 0. At this moment, data with respect to four sets of views is captured, leading to encoded data: two top field texture views (310 and 312) and two corresponding depth views (314 and 316). A view_id represents a designation for the perspective of the views. In the present example, view_id=0 is a view captured from position POS 1, while view_id=1 is a view captured from position POS 2. Accordingly, as shown in FIG. 3, texture view 310 is encoded based on data captured from the same position as depth view 314, while texture view 312 is encoded based on data captured from the same position as depth view 316. Accordingly, data included within AU 302 may be utilized to synthesize 3D video content which has multiple views associated with different positions at POC 0.

For AU 304, POC 1 is the next moment that data is captured to be included in AU 304, after the capturing moment for data captured which is included in AU 302 (at POC 0). At POC 1, only two sets of views are captured, which are encoded: bottom field texture views (320 and 322). Continuing the example from before, view_id=0 may be a view captured from position POS 1, while view_id=1 may be a view captured from position POS 2. Accordingly, data that is encoded as texture view 320 is captured from the same position as texture view 310 and depth view 314, while data that is encoded as texture view 322 is captured from the same position as texture view 312 and depth view 316. Since the depth view is progressive, data related to the depth view is captured at every other POC and no data related to depth view is captured to be included in AU 304. Similar to synthesis of a video frame for AU 302, data included in AU 304 (i.e., texture views 320 and 322) may be utilized to synthesize 3D video content which may have multiple views at different positions at POC 1. However, since AU 304 does not contain depth data, progressive depth data from AU 302 must be utilized to generate the synthesized video along with the texture data in AU 304. This may lead to inefficiencies due to a lack of precise correspondence between texture data and depth data that is captured at different POCs.

Figure 4:
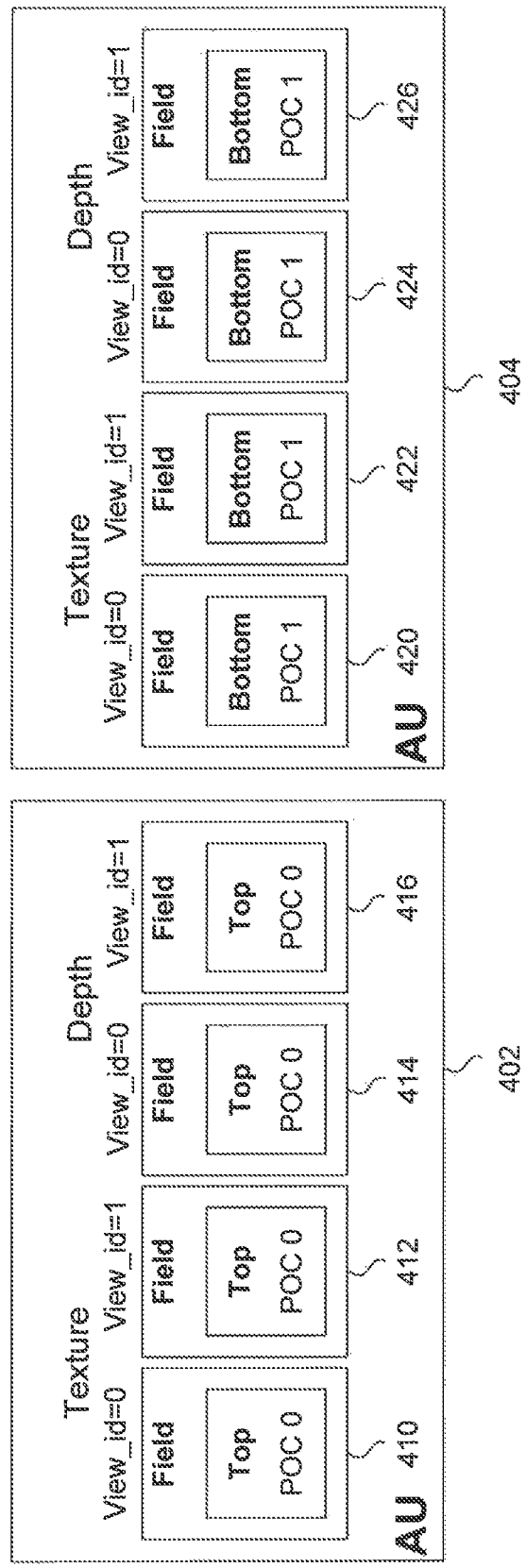
FIG. 4 illustrates exemplary access units generated when interlaced texture data is captured and interlaced depth data is captured.

FIG. 4 illustrates exemplary access units 402 and 404 generated when interlaced texture data is captured and interlaced depth data is captured. Accordingly, top field and bottom field data are captured both for texture and data. Here, AU 402 and AU 404 respectively contain encoded data based on data captured at POC 0, that is, the time or moment at which image data is captured, and at POC 1. For AU 402, at POC 0, data with respect to four sets of views is captured, based on which data are encoded: two top field texture views (410 and 412) and two corresponding top field depth views (414 and 416). As in the description of access units 302 and 304, view_id represents a designation for the perspective of the views. In the present example, view_id=0 is a view captured from position POS 1, while view_id=1 is a view captured from position POS 2. Accordingly, as shown in FIG. 4, texture view 410 is encoded based on data captured from the same position as depth view 414, while texture view 412 is encoded based on data captured from the same position as depth view 416. Accordingly, data included within AU 402 may be utilized to synthesize 3D video content which has multiple views at POC 0.

For AU 404, at POC 1, the contents are encoded based on data captured similarly to the contents of AU 402, that is, data is captured from view_id=0 and view_id=1, and encoded: two bottom field texture views (420 and 422) and two corresponding bottom field depth views (424 and 426). Therefore, continuing the example from before, the texture view 420 and depth view 424 may also be encoded based on data captured from position POS 1, while texture view 422 and depth view 426 may also be encoded based on data captured from position POS 2.

Since, depth data is interlaced and captured for both the top field and the bottom field, in principle, video field synthesis is more efficient and accurate, because at every moment when texture data is captured, corresponding depth data is captured allowing for generation of accurate video field which may then be utilized for synthesis of multi-view 3D data.

Figure 5:
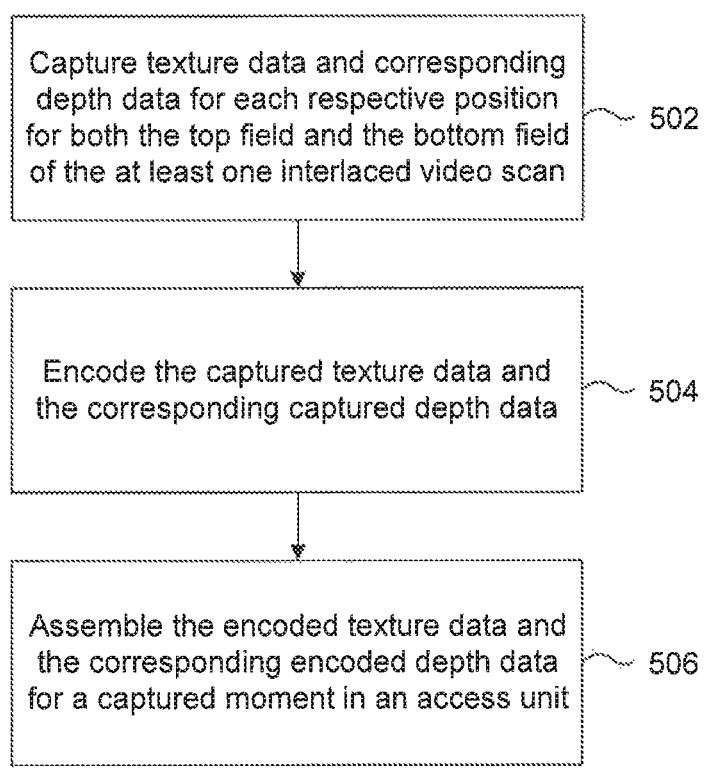
FIG. 5 illustrates an exemplary method of coding interlaced data according to an exemplary embodiment.

FIG. 5 illustrates an exemplary method 500 of coding interlaced data according to an embodiment. As discussed previously, the interlaced data is captured from a plurality of different positions. Furthermore, the interlaced data includes data captured by scanning a top field and a bottom field for each video frame. The top field includes every other line starting with a top line of the frame and the bottom field including the interposed lines in the frame. For example, at a frame rate of 30 frames per second, each scan may occur at $\frac{1}{60}^{th}$ of a second, so that the top field is captured at $\frac{1}{60}^{th}$ of a second and then the bottom field is captured at the next $\frac{1}{60}^{th}$ of a second, i.e., at $\frac{2}{60}^{th}$ of a second. This process is repeated so that at $\frac{3}{60}^{th}$ of a second the top field is captured and then at $\frac{4}{60}^{th}$ of a second the bottom field is captured. In embodiments, the scans may occur at different time intervals, however, the concept of alternating between the top field and the bottom field remains the same. Each time data is captured for an interlaced video, the POC increments by 1.

Therefore, for method 500, in step 502, texture data and corresponding depth data are captured for each respective position for both the top field and the bottom field of the at least one interlaced video scan. For example, at positions POS 1 and POS 2, texture views and depth views are captured. The texture views and the depth views captured at POS 1 correspond to each other while the texture views and the depth views captured at POS 2 correspond to each other. These views would be provided to, e.g., encoders 102-108 shown in FIG. 1.

In step 504, the captured texture data and the corresponding captured depth data are encoded. For example, with reference to FIG. 1, texture views 110 and 112 are encoded as encoded texture data units 120 and 122, while depth views 114 and 116 are encoded as encoded depth data units 124 and 126.

In step 506, the encoded texture data unit and the corresponding encoded depth data unit are assembled for each captured moment in a respective access unit. For example, with reference to FIG. 1, assembler 130 assembles encoded texture data units 120 and 122 (based on texture views 110 and 112) and the corresponding encoded texture data units 124 and 126 (based on depth views 114 and 116) to one access unit. This access unit may be a part of, for example, bitstream 132, that is transmitted and may later be decoded to synthesize 3D video data, for example, one of AUs 134, 136 and 138.

In exemplary embodiments, a first access unit includes encoded data based on texture data and the corresponding depth data captured for each respective position for a top field of a first interlaced video scan and a second access unit includes encoded data based on the texture data and the corresponding depth data for each respective position for a bottom field of the first interlaced video scan, for example, AU 402 and AU 404.

Figure 6:
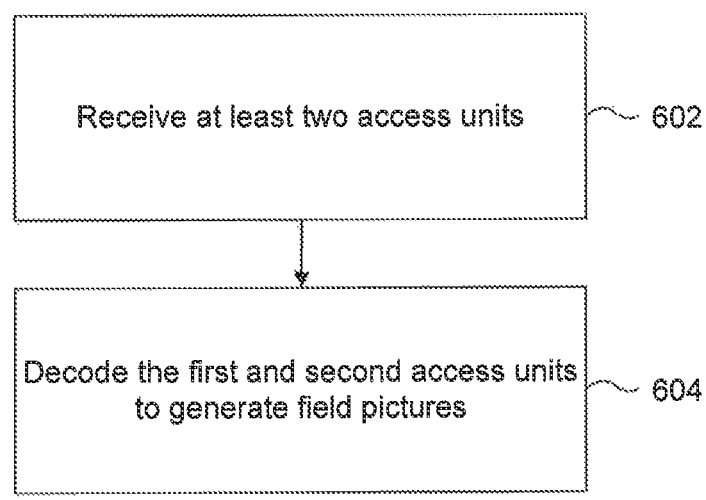
FIG. 6 illustrates an exemplary method of decoding interlaced data according to an exemplary embodiment.

FIG. 6 illustrates an exemplary method 600 of decoding interlaced data according to an embodiment. As discussed previously, interlaced data includes data captured by scanning a top field and a bottom field for each video frame. The top field includes every other line starting with a top line of the frame and the bottom field including the interposed lines in the frame.

Accordingly, for decoding, in step 602, at least two access units are received. A first one of the received access units includes encoded texture data and corresponding encoded depth data for at least one capturing position for a top field of at least one interlaced video scan. A second one of the access units includes encoded texture data and corresponding depth encoded data for the at least one capturing position for a bottom field of at least one interlaced video scan. An example is receiving AUs 402 and 404 which include encoded data that is based on data captured for respective positions including top field data and bottom field data, respectively.

In step 604, the first and second access units are decoded to generate field pictures or views for each frame, wherein for each of the at least one capturing position, respective depth field pictures and respective texture field pictures are generated for both the top field and the bottom field. Therefore, for example, data for each access unit 402 or 404 is generated for respective decoded views 140, 142, 144 and 146.

In exemplary embodiments, these corresponding depth and texture pictures or views can be utilized to synthesize a 3D view from further virtual views other than the captured views. Synthesis based on a set of frames is well known in the art and will not be discussed further.

In additional exemplary embodiments, signals enabling the interlaced depth coding are generated due to one of a physical action on a capturing device, a message received from a network, or a function of a stored computer program. These signals may be provided to the respective encoders, e.g., encoders 102-108, so that at each scan of a top field and a bottom field, all captured texture views are encoded along with corresponding depth views. Accordingly, the same signals may be provided to the assembler, e.g., assembler 130, so that each access unit may include all data captured at a moment, for example, a first access unit includes all texture data and corresponding depth data for a top field and a second access unit included all texture data and corresponding depth data for a bottom field. The signals may allow obtaining parameters from an encoder configuration file including an interlace depth flag or may allow assembling based on the signal comprises obtaining parameters from an assembler configuration file including an interlace video flag and the interlace depth flag. These respective flags may be utilized within the encoder or the assembler, to determine how the respective encoding or assembling may occur. For example, the flags may indicate that interlaced depth data is to be encoded.

Figure 7:
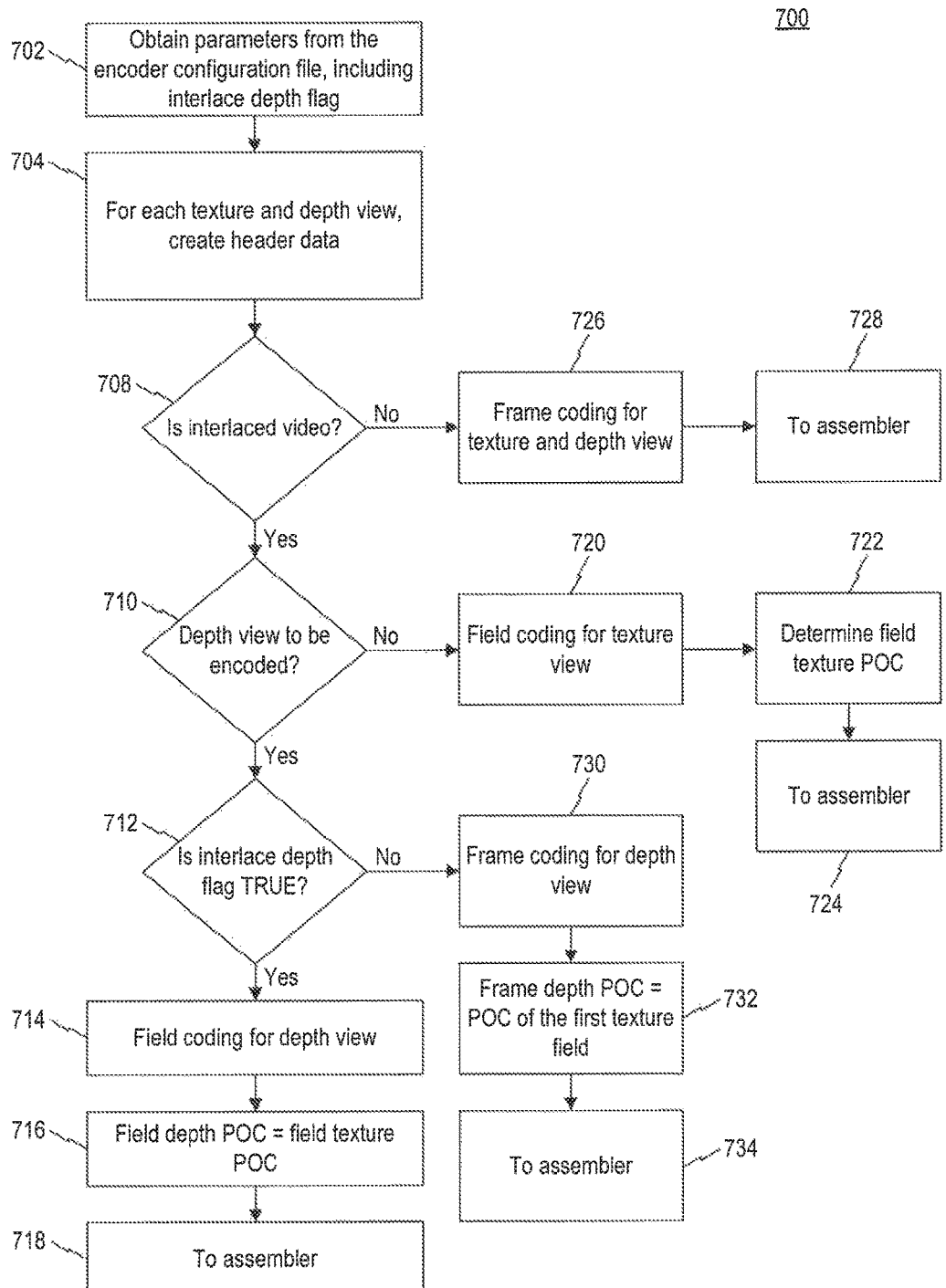
FIG. 7 illustrates a method of encoding data according to an exemplary embodiment.

FIG. 7 illustrates a method 700 by which an encoder encodes data according to an exemplary embodiment. For example, method 700 may be implemented for encoding within any of encoders 104, 104, 106, or 108.

In step 702, the encoder obtains parameters from the configuration file, including the interlace depth flag. The interlace depth flag indicates whether the encoder may encode captured interlaced depth data that is being captured.

In step 704, for each captured texture and depth view, create header data. For example, for each texture view or depth view component that is captured, the encoder creates a header file according to the configuration specified in the configuration file (SPS, PPS, etc.).

In step 708, the encoder checks whether the received data is an interlaced video based on the header.

When it is determined that the received data is not an interlaced video in step 708, it means that both texture and depth data are captured progressively. Therefore, in step 726, the encoder performs traditional progressive frame coding for the data representing the current captured component.

In step 728, the traditionally progressively coded data in step 726 is sent to the assembler, i.e, assembler 130.

However, when it is determined that the received data is an interlaced video in step 708, in step 710, the encoder checks whether the current captured component is a depth view which should be encoded.

If the current captured component is determined not to be a depth view which should be encoded, then the component is a texture view, and in step 720, traditional field coding is performed.

In step 722, a picture order count (POC) is determined for the field texture component.

In step 724, the traditional field coded data from step 720 along with the POC from step 722 is sent to the assembler.

If in step 710, it is determined that the current captured component is a depth view which should be encoded, then in step 712, the encoder checks whether the interlace depth flag is set as TRUE in the configuration file.

If the interlace depth flag is not set as TRUE, then the encoder may not apply interlace coding to the captured depth view. Instead in step 730, frame coding or progressive coding is applied for the depth view.

In step 732, the POC of the depth frame is set equal to the POC of the first texture field of an interlaced video.

In step 734, the frame coded data from step 730 along with the POC from step 732 is sent to the assembler.

However, if in step 712, it is determined that the interlace depth flag is set as TRUE, then the encoder applies interlace coding to the captured depth view. That is all, data captured at a particular capturing moment for either a top field or a bottom field of a frame is encoded by application of interlace coding.

Therefore, in step 714, field (interlace) coding is applied to the captured depth view.

In step 716, the POC for each depth view is set to be the same as a POC for each corresponding texture view that is captured at a particular capturing moment.

In step 718, the field (interlace) coded data from step 714 along with the POC from step 716 is sent to the assembler.

Figure 8:
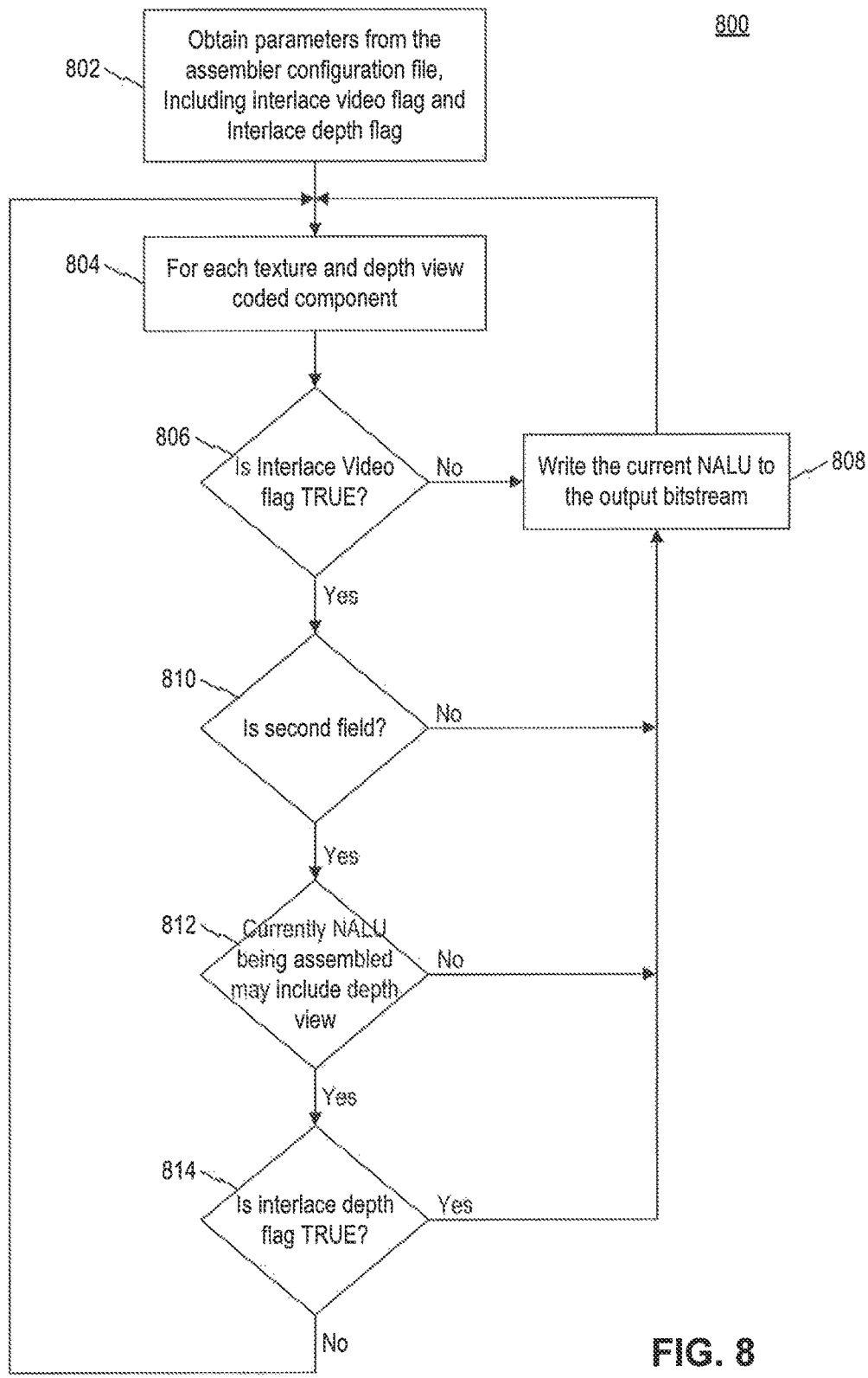
FIG. 8 illustrates a method of assembling encoded data according to an exemplary embodiment.

FIG. 8 illustrates a method 800 by which an assembler assembles encoded data according to an exemplary embodiment.

In step 802, the assembler obtains parameters from the assembler configuration file, including the interlace video flag and the interlace depth flag. The interlace depth flag indicates whether interlaced depth data is to be assembled.

Step 804 represents the fact that steps 806 to 814 may be applied to each texture and depth view coded component.

In step 806, the assembler checks whether an interlace video is signaled, i.e., the interlace video flag is set to TRUE.

If the interlace video flag is not set to TRUE, then in step 808, even if the coded component is a coded texture component or a coded depth component, the current Network Abstraction Layer Unit (NALU) is written to the output bitstream.

Otherwise, if the interlace video flag is set to TRUE, then in step 810, the assembler checks if the coded component under consideration is associated with a second field. If the component is not associated with the second field, then the current NALU is for the first field. Therefore, in step 808, even if the coded component is a coded texture component or a coded depth component, the current NALU is written to the output bitstream Otherwise, if the current component is associated with a second field, then in step 812, the assembler checks whether the current NALU may include depth data.

If the current NALU does not include depth data, then in step 808, the current NALU, which would be a texture field NALU, is written to the output bitstream.

Otherwise, if the current NALU does include depth data, then in step 814, the assembler checks to see whether interlace depth coding is indicated by the setting of the interlace depth flag as TRUE.

If the flag is set as TRUE, then in step 808, the current NALU, which includes texture data and corresponding depth data is written to the output bitstream.

However, if the flag is not set as TRUE, it means the depth data is progressive coded. Therefore, there is no depth data included in the NALU for the second field.

The implementations described herein may be implemented in, for example, a method or a process, an apparatus, a software program, a data stream, or a signal. For example, the parameters obtained from the configuration file, in step 702 and step 802, could be signals generated due to one of a physical action on a capturing device, a message received from a network, or a function of a stored computer program. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants, and other devices that facilitate communication of information between end-users, or between server and clients, or between cloud center and clients, etc.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, an assembler for assembling bitstreams to transmit, a video codec, a web server, a set-top box, a laptop, a personal computer, a cell phone, a PDA, and other communication devices.

Any of the disclosed embodiments could be implemented on a chip. Specifically, any embodiment could be implemented by using a hardware description language (such as Verilog or VHDL) for circuit design, including circuit integration and layout. A circuit may be designed utilizing the hardware description language in numerous manners. For example, the manufacturer of integrated circuits may realize implementation with application-specific integrated circuits (ASIC) or customer-design integrated circuits.

While certain features and embodiments have been described, other embodiments will be apparent to those skilled in the art from consideration of the specification and practice of the embodiments disclosed herein. Furthermore, although aspects of embodiments have been described in part as software, computer-executable instructions, and/or other data stored in memory and other storage media, one skilled in the art will appreciate that these aspects can also be stored in or read from other types of tangible, non-transitory computer-readable media, such as secondary storage devices like hard disks, floppy disks, or CD-ROMs, or other forms of RAM or ROM. Further, the steps of the disclosed methods may be modified in various ways, including by reordering steps and/or inserting or deleting steps, without departing from the principles of the invention.

It is intended that the specification and examples be considered as exemplary only, with a true scope and spirit of the invention being indicated by the following claims.

What is claimed is:

1. A method for coding interlaced video data captured from a plurality of different positions, the interlaced video data including data for a top field and a bottom field for at least one interlaced video scan, the top field including every other line starting with a top line of a frame and the bottom field including interposed lines in the frame, the method comprising:

capturing texture data and corresponding depth data for the plurality of different positions for both the top field and the bottom field of the at least one interlaced video scan, wherein the capturing of the texture data and the corresponding depth data comprises:

for each scan of the at least one interlaced video scan, capturing the texture data and the corresponding depth data for the top field at a first time interval and the texture data and the corresponding depth data for the bottom field at a second time interval apart from the first time interval;

encoding the captured texture data and the corresponding captured depth data; and assembling the encoded texture data and the corresponding encoded depth data for a captured moment in an access unit.

2. The method of claim 1, wherein:
the captured texture data contains luma and chroma information with respect to each pixel of the top field and the bottom field from the plurality of different positions; and
the corresponding captured depth data contains luma information containing depth information regarding objects in the top field and the bottom field from the plurality of different positions.

3. The method of claim 2, wherein the depth information comprises lighter shaded objects in the gray level image being closer to the plurality of different positions and darker objects being further away from the plurality of different positions.

4. The method of claim 1, wherein assembling the encoded texture data and the corresponding encoded depth data for a captured moment in an access unit comprises:
assembling in a first access unit, the encoded texture data and the corresponding encoded depth data based on the texture data and the depth data captured for the plurality of different positions for a top field of a first interlaced video scan; and
assembling a second access unit, the encoded texture data and the corresponding encoded depth data based on the texture data and the corresponding depth data for the plurality of different positions for a bottom field of the first interlaced video scan.

5. The method of claim 1, wherein capturing the texture data and the corresponding depth data for the plurality of different positions comprises capturing the texture data and the corresponding depth data for the plurality of different positions at a same picture order count.

6. The method of claim 1, further comprising:
enabling the interlaced depth coding or the assembling based on a signal generated due to one of a physical action on a capturing device, a message received from a network, or a function of a stored computer program.

7. The method of claim 6, wherein:
the coding based on the signal additionally comprises:
obtaining parameters from the signal including an interlace depth flag;
creating header data based on the obtained parameters;
checking to see if captured data is from an interlaced video and if the captured data is not, determining that progressive coding is to be applied to the captured texture data and captured depth data;
checking if there is captured interlace depth data to be coded; and
checking if the interlace depth flag indicates interlace depth coding;
the assembling based on the signal additionally comprises:
obtaining parameters from the signal including an interlace video flag and the interlace depth flag;
checking if the interlace video flag indicates interlaced video coding;
determining that a current network abstraction layer unit (NALU) being assembled belongs to a second field;
checking whether the current NALU contains captured depth data; and
writing the current NALU to an output bitstream when the interlace depth flag is indicative of interlacing the capture depth data.

8. A method for decoding interlaced video data, comprising:
receiving at least two access units, a first access unit including encoded texture data and corresponding encoded depth data for a plurality of capturing positions for a top field of at least one interlaced video scan and a second access unit including encoded texture data and corresponding encoded depth data for the plurality of capturing positions for a bottom field of the at least one interlaced video scan, wherein, for each scan of the at least one interlaced video scan, capturing of the texture data and the corresponding depth data for the top field and capturing of the texture data and the corresponding depth data for the bottom field are at time intervals apart from each other; and
decoding the first and second access units to generate field pictures, wherein for each of the plurality of capturing positions, respective depth field pictures and respective texture field pictures are generated for both the top field and the bottom field.

9. A non-transitory computer readable recording medium for storing one or more programs, the one or more programs causing a processor to perform the method according to any one of claims 1 and 8 after the program is loaded on a computer and is executed.

10. A device for coding interlaced video data captured from a plurality of different positions, the interlaced video data including data for a top field and a bottom field for at least one interlaced video scan, the top field including every other line starting with a top line of a frame and the bottom field including interposed lines in the frame, comprising one or more processors, the one or more processors being configured to:
capture texture data and corresponding depth data for the plurality of different positions for both the top field and the bottom field of the at least one interlaced video scan, wherein the capture of the texture data and the corresponding depth data comprises:
for each scan of the at least one interlaced video scan, capturing the texture data and the corresponding depth data for the top field at a first time interval and the texture data and the corresponding depth data for the bottom field at a second time interval apart from the first time interval;
encode the captured texture data and the corresponding captured depth data; and
assemble the encoded texture data and the corresponding encoded depth data for a captured moment in an access unit.

11. The device of claim 10, wherein:
the captured texture data contains luma and chroma information with respect to each pixel of the top field and the bottom field for the plurality of different positions; and
the corresponding captured depth data contains luma information containing depth information regarding objects in the top field and the bottom field from the plurality of different positions.

12. The device of claim 11, wherein the depth information comprises lighter shaded objects in the gray level image being closer to the plurality of different positions and darker objects being further away from the plurality of different positions.

13. The device of claim 10, wherein assemble the encoded texture data and the corresponding encoded depth data for a captured moment in an access unit comprises:
assembling in a first access unit, the encoded texture data and the corresponding encoded depth data based on the texture data and the depth data captured for the plurality of different positions for a top field of a first interlaced video scan; and assembling a second access unit, the encoded texture data and the corresponding encoded depth data based on the texture data and the corresponding depth data for the plurality of different positions for a bottom field of the first interlaced video scan.

14. The device of claim 10, wherein the capture of the texture data and the corresponding depth data for the plurality of different positions comprises capturing the texture data and the corresponding depth data for the plurality of different positions at a same picture order count.

15. The device of claim 10, wherein the one or more processors are further configured to:
enable the interlaced depth coding or the assembling based on a signal generated due to one of a physical action on a capturing device, a message received from a network, or a function of a stored computer program.

16. A device for decoding interlaced video data, comprising one or more processors, the one or more processors being configured to:
receive at least two access units, a first access unit including encoded texture data and corresponding encoded depth data for a plurality of capturing positions for a top field of at least one interlaced video scan and a second access unit including encoded texture data and corresponding encoded depth data for the plurality of capturing positions for a bottom field of the at least one interlaced video scan, wherein, for each scan of the at least one interlaced video scan, capturing of the texture data and the corresponding depth data for the top field and capturing of the texture data and the corresponding depth data for the bottom field are at time intervals apart from each other; and
decode the first and second access units to generate field pictures, wherein for each of the plurality of capturing positions, respective depth field pictures and respective texture field pictures are generated for both the top field and the bottom field.

17. A chip for coding interlaced video data captured from a plurality of different positions, the interlaced video data including data for a top field and a bottom field for at least one interlaced video scan, the top field including every other line starting with a top line of a frame and the bottom field including interposed lines in the frame, comprising one or more integrated circuits, the one or more integrated circuits being configured to:
capture texture data and corresponding depth data for the plurality of different positions for both the top field and the bottom field of the at least one interlaced video scan, wherein the capture of the texture data and the corresponding depth data comprises:
for each scan of the at least one interlaced video scan, capturing the texture data and the corresponding depth data for the top field at a first time interval and the texture data and the corresponding depth data for the bottom field at a second time interval apart from the first time interval;
encode the captured texture data and the corresponding captured depth data; and
assemble the encoded texture data and the corresponding encoded depth data for a captured moment in an access unit.

18. A chip for decoding interlaced video data, comprising one or more integrated circuits, the one or more integrated circuits being configured to:
receive at least two access units, a first access unit including encoded texture data and corresponding encoded depth data for a plurality of capturing positions for a top field of at least one interlaced video scan and a second access unit including encoded texture data and corresponding encoded depth data for the plurality of capturing positions for a bottom field of the at least one interlaced video scan, wherein, for each scan of the at least one interlaced video scan, capturing of the texture data and the corresponding depth data for the top field and capturing of the texture data and the corresponding depth data for the bottom field are at time intervals apart from each other; and
decode the first and second access units to generate field pictures, wherein for each of the plurality of capturing positions, respective depth field pictures and respective texture field pictures are generated for both the top field and the bottom field.

* * * * *